United States Patent [19]

Kashiwakura et al.

[11] Patent Number: 5,590,097
[45] Date of Patent: Dec. 31, 1996

[54] MAGNETOOPTIC RECORDING MEDIUM

[75] Inventors: Akira Kashiwakura, Yuuki-gun; Katsusuke Shimazaki, Kitasouma-gun; Masafumi Yoshihiro, Yuuki-gun; Shin-Itsu Kinoshita, Toride; Norio Oota, Kitasouma-gun; Hisanori Sugiyama, Tsukube, all of Japan

[73] Assignee: Hitachi Maxell, Ltd., Ibaraki-ken, Japan

[21] Appl. No.: 356,547

[22] Filed: Dec. 15, 1994

[30] Foreign Application Priority Data

Dec. 15, 1993 [JP] Japan ............................ 5-343732

[51] Int. Cl.$^6$ ............................................. G11B 7/00
[52] U.S. Cl. ................... 369/13; 369/275.2; 369/116; 360/59
[58] Field of Search ........................... 369/13, 14, 116, 369/275.2, 275.4; 360/59, 114

[56] References Cited

U.S. PATENT DOCUMENTS 5,345,434 9/1994 Ide et al. .......................... 369/59
5,400,318 3/1995 Nakayama et al. .................. 369/59
5,485,449 1/1996 Nakajo ............................. 369/116

*Primary Examiner*—David C. Nelms
*Assistant Examiner*—Vu A. Le
*Attorney, Agent, or Firm*—Birch, Stewart, Kolasch & Birch, LLP

[57] ABSTRACT

A magnetooptic recording medium which includes a substrate and a magnetooptic recording film thereon, the substrate having a surface comparted into a plurality of tracks on which magnetooptic recording signals are recorded, and a part of the tracks, selected from the plurality of tracks, including clusters of pre-pits wherein a variation of a change in light amount due to local birefringence in the vicinity of the pre-pits is not more than 20% with respect to a change in light amount in the absence of the local birefringence, when signals from the tracks with recorded magnetooptic recording signals are measured by changes in light amount on the basis of Kerr rotational angles of reflected light from the medium, which magnetooptic recording medium can be effectively used for a ZCAV system.

11 Claims, 7 Drawing Sheets

MAGNETOOPTIC RECORDING MEDIUM

BACKGROUND OF THE INVENTION

1. Field of the Invention

The present invention relates to a magnetooptic recording medium for recording information signals, and more specifically, to a magnetooptic recording medium for secondary information signals on a recording film in a vertical direction by irradiating an energy beam such as a laser beam under an external magnetic field.

2. Discussion of Related Art

Optical recording media having excellent properties such as large capacity, high reliability and long life have been developed. Among them, in particular, there is a great demand for a magnetooptic recording medium which is erasable by a user. In recent years, the expectation has been for the magnetooptic recording medium to have a larger capacity and a higher processing speed, since the quantity of information has steadily increased and become increasingly diverse. To attain a large capacity, methods for increasing a recording density are known, including a method for equalizing recording densities in all regions of a disk by using, for example, a ZCAV system, a method for increasing the linear density by using, for example, a mark edge recording system, and a method for increasing the number of tracks in the radial direction of a disk by narrowing the width of the tracks.

Pre-pits are formed on an optical disk substrate for use in a pre-format, such as address information, timing setting and tracking setting. When the tracks for recording have a narrow width, a signal to be reproduced from a track is more likely to be influenced by adjacent grooves and lands due to cross-talk or deficiency in transfer of pre-pits (hereinafter referred to as "pit deviation") during molding of a resin substrate. As a result, the reproduced signal may suffer variation. The variation in reproduced signals is a major error causing factor, resulting in various problems, such as increase in error rate. In the conventional art, reproduced signals have been processed, for example, by differentiation. Thus, the variation could be eliminated or decreased conveniently by means of the differentiation even when a small variation is given as in the conventional art. However, the variation remains as it is when using an original waveform slice process in which an original waveform itself is subjected to a slicing process to be converted into a binary system, which has been a problem.

Additionally, in the case of a format in which pre-pits are not aligned on adjacent tracks in a radial direction of a disk but exist at positions deviating in circumferential directions of the tracks, such as the ZCAV system, the pre-pits cause variation in reproduced signals in recording regions adjacent to or near the pre-pits, which has been a problem.

As the width of the tracks becomes narrower in accordance with the rapid advances in recent years to realize a high density, it becomes difficult to carry out signal processing, such as differentiation of reproduced signals. For this reason, it may be rather desirable to use the original waveform slice process for magnetooptic recording media having narrow tracks and high densities in recent years. However, even though this system encounters variation in reproduced signals, it cannot eliminate or decrease the variation, resulting in a problem in that correct conversion into a binary system is not performed. Thus, the variation is especially noticed as an important problem.

Additionally, in the conventional art, in the case of a format in which pre-pits are not aligned on adjacent tracks in a radial direction of a disk but exist at positions deviating in circumferential directions of the tracks, an influence of the pre-pits appears as variation in signals reproduced from recording positions where the pre-pits exist on adjacent or near tracks on a molded resin substrate. The variation appears in a signal detected at a zone boundary area in the case of the ZCAV system.

Some causes for occurrence of variation are a matter of speculations. Among them, it is especially pointed out as a major cause that turbulence occurs in a flow of a resin at positions where pre-pits are formed during injection molding of a resin substrate, resulting in the formation of a local portion having large birefringence in a recording area where the pre-pits exist on adjacent or near tracks. The birefringence generates retardation in polarized light which is reflected from the substrate. It has been hitherto considered that a positive correlation exists between transfer performance during molding of a resin substrate and C/N (Carrier To Noise Ratio). Therefore, molding conditions for a resin substrate have been designed to carry out satisfactory transfer. However, if the transfer rate is set to an extremely high value in consideration of the transfer performance, an excessive pressure is applied to the resin itself, which has exerted a number of bad influences, such as increase in turbulence of the resin flow due to formation of pre-pits and grooves, and occurrence of large birefringence due to solidification at a maintained high pressure.

The occurrence of retardation due to adjacent pre-pits is a source of trouble in the same manner as in the cross-talk and the pit deviation, because it varies reproduced signals of magnetooptic information. In order to avoid such variation in magnetooptic information signals which cause a signal error, it is important to exclude turbulence in the flow of resin at positions of pre-pits during injection molding of the resin substrate and form a uniform resin at recording positions where pre-pits exist on adjacent or near tracks.

Various methods are known for measuring the local turbulence of a resin. For example, the local turbulence of a resin, that is variation in retardation, varies reproduced signals of magnetooptic information. By using this fact, a magnetooptic recording film formed on the resin may be measured to determine a degree of the turbulence by using an apparatus for converting a rotational angle of polarization into a change in light amount. A value (A) is obtained by measuring a magnetooptic signal from a predetermined track as a change in light amount in the absence of a turbulence in the flow of the resin in the vicinity of pre-pits. A value (B) is obtained by measuring the same magnetooptic signal as a change in light amount in a region within 10 tracks from tracks including a cluster of pre-pits, that is a region subjected to variation in retardation due to the presence of the pre-pits. A value (a) is obtained according to an equation, (B)−(A)=(a).

It has been found that a resin substrate having a ratio (a/A) of not more than 20% can avoid problems due to the pre-pits. On the contrary, if a resin substrate has a ratio (a/A) of more than 20%, the turbulence of the resin becomes large, and local birefringence, i.e., retardation of reflected light, is apt to become large. Alternatively, in the case of measurement by using a variation amount of retardation measured with convergent light, a resin substrate is desirable in which the variation amount in an adjacent portion within 10 tracks from pre-pits is adjusted to be not more than 10 nm.

SUMMARY OF THE INVENTION

Therefor, it is an object of the present invention to provide a magnetooptic recording medium for recording information signals which will overcome the above-noted disadvantages.

It is a further object of the present invention to provide a magnetooptic recording medium in which the variation amount of magnetooptic information signals due to adjacent pre-pits is small and occurrence of error is eliminated, even when it has a format in which pre-pits are not aligned on adjacent tracks in a radial direction of a disk but exist at positions deviating in circumferential directions of the tracks, such as the ZCAV system.

The foregoing objects and others are accomplished in accordance with the present invention, generally speaking, by providing medium for a user to record and reproduce magnetooptic information signals on tracks adjacent to or near tracks with arranged pre-pits on a format in which the pre-pits exist at positions deviating in circumferential directions of the tracks, such as a ZCAV (Zoned Constant Angular Velocity) system, and are not aligned on adjacent tracks in a radial direction of a disk. The invention more specifically relates to a high density recording medium in which conversion into a binary system is extremely sensitive to variation in signals, for example, when information signals are reproduced by slicing an original waveform in a mark edge detection system.

According to a first aspect of the present invention, there is provided a magnetooptic recording medium comprising a substrate and a magnetooptic recording film thereon, the medium having a plurality of tracks on which magnetooptic recording signals are recorded, a part of the tracks, selected from the plurality of tracks, including clusters of pre-pits having pre-pit densities of at least $2 \times 10^5$ pre-pits/mm$^2$, wherein (a/A)$\leq$20% is satisfied, provided that (a) is a difference in magnitude between a variation in light amount detected in a track region within 10 tracks from the tracks including the cluster of pre-pits and a variation in light amount (A) detected in a track region other than the track region, when signals from the tracks with recorded magnetooptic recording signals are measured by changes in light amount on the basis of Kerr rotational angles of reflected light from the medium. In the magnetooptic recording medium of the present invention, the variation in magnetooptic information signals due to adjacent pre-pits is extremely small, and occurrence of signal error is extremely rare.

According to a second aspect of the present invention, there is provided a method for producing substrates for magnetooptic recording media comprising injection-molding a resin with an optical elastic constant of not more than $1 \times 10^{-3}$ mm$^2$/kg into a mold with an attached stamper at a mold temperature of 111°–142° C. at a dwell pressure of 150–600 kg/cm$^2$ for a dwell period selected within a time range of 0.18–0.43 second, so that a variation of the amount of retardation measured by using convergent light is not more than 10 nm.

According to a third aspect of the present invention, there is provided a method for producing substrates for magnetooptic recording media comprising injection-molding a resin with an optical elastic constant of not more than $1 \times 10^{-3}$ mm$^2$/kg into a mold with an attached stamper for a dwell period of 0.15–0.44 second at a dwell pressure of 150–600 kg/cm$^2$ at a mold temperature selected within a temperature range of 115°–139° C. so that a variation of the amount of retardation measured by using convergent light is not more than 10 nm.

According to a fourth aspect of the present invention, there is provided a method for producing substrates for magnetooptic recording media comprising injection-molding a resin with an optical elastic constant of not more than $1 \times 10^3$ mm$^2$/kg into a mold with an attached stamper at a mold temperature of 111°–142° C. for a dwell period of 0.15–0.44 second at a dwell pressure selected within a range of 172–585 kg/cm$^2$ so that a variation of the amount of retardation measured by using convergent light is not more than 10 nm.

According to a fifth aspect of the present invention, there is provided a magnetooptic recording medium comprising a substrate and a magnetooptic recording film thereon, the substrate having a surface comparted into a plurality of tracks on which magnetooptic recording signals are recorded, and a part of the tracks selected from the plurality of tracks including clusters of pre-pits, wherein a variation of a change in light amount due to local birefringence in the vicinity of the pre-pits is not more than 20% with respect to a change in light amount in the absence of the local birefringence, when signals from the tracks with recorded magnetooptic recording signals are measured by changes in light amount on the basis of Kerr rotational angles of reflected light from the medium.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DISCUSSION OF THE INVENTION

A cause, that is the retardation which becomes large due to the influence by adjacent pre-pits, has a considerably high percentage in all causes for generating a variation in magnetooptic information signals which may be a factor of a signal error. One of the means for suppressing the local increase in birefringence, i.e. retardation of reflected light, is a method for optimizing a shape and a size of the pre-pits. Specifically, a large effect is obtained by making the depth of the pits shallow and making the inclination of side surfaces of the pits gentle.

As an alternative method, the variation in retardation due to adjacent pre-pits can be also reduced by optimizing molding conditions. Specifically, for example, the variation can be effectively reduced by changing molding conditions to lower transfer performance of grooves and pre-pits as compared with the ordinary molding condition. In particular, as for the molding conditions, a large effect can be obtained by raising a mold temperature or a resin temperature in a molding machine, decreasing a dwell pressure during molding, and/or shortening a dwell period thereof.

However, the mold temperature and the resin temperature are conditional factors which serve in the same manner in relation to temperature. They have an identical correlation to the transfer performance, or the retardation or the variation in magnetooptic information signals affected by the transfer performance. The mold temperature is 111°–142° C. (corresponding to the resin temperature of 310°–375° C.), the dwell pressure is 150–600 kg/cm$^2$, the dwell period is 0.15–0.44 second, and a combination of each of them is optimized within these ranges. Thus, the variation in magnetooptic information signals can be greatly suppressed, and occurrence of a signal error can be greatly reduced. This makes it easy to use the original waveform slicing process.

PREFERRED EMBODIMENTS

The present invention will be explained in detail below with reference to the following Examples. Magnetooptic information signals in a recorded state were reproduced by using a magnetooptic head with a laser wavelength of 780 nm and a numerical aperture of 0.55 from a magnetooptic disk which had a diameter of 5.25 inches, made of a plastic substrate and formatted in a ZCAV format with a track pitch of 1.348 μm (1024B/sector). Concerning the magnetooptic information signals, variation amounts in zone boundary areas were examined. The power of the laser beam for reproduction of signals was 1.5 mW, and the linear velocity at the measuring position was 9.42 m/s. With respect to recording, signals with a frequency of 6.28 MHz and a pulse width of 60 ns were recorded with a power to maximize a carrier. A screw injection compression molding machine was used for molding the disk. A polycarbonate resin was used as the plastic material.

Figure 1:
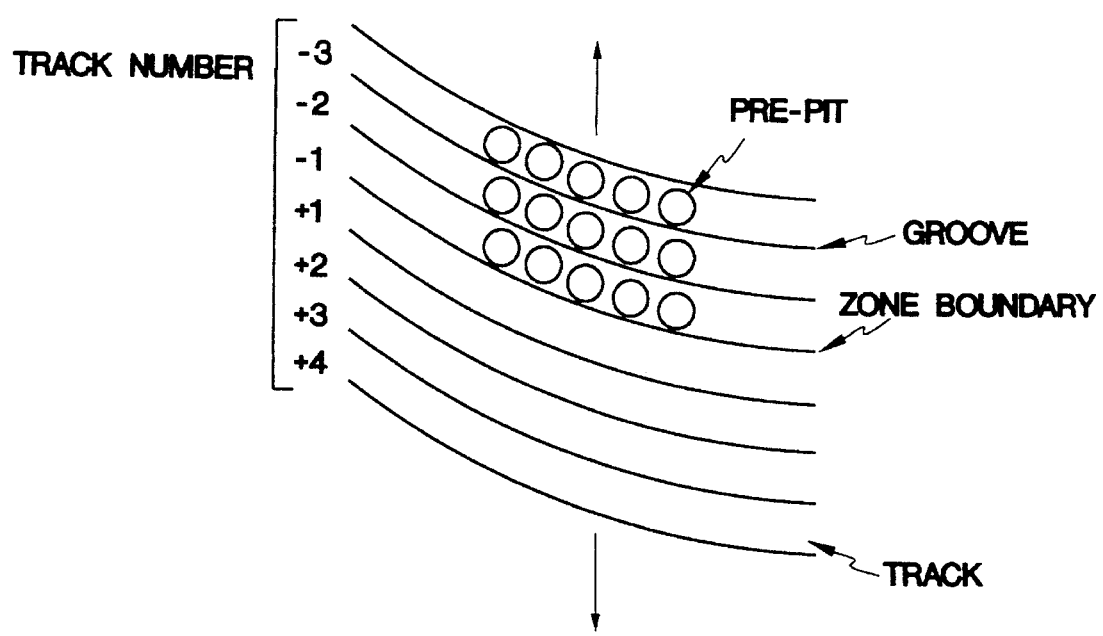
FIG. 1 illustrates a definition of track numbers in a zone boundary area as used in the Examples.

At first, a definition of track numbers in a zone boundary area is shown in FIG. 1 in order to refer to Examples of the present invention below. The illustrated track numbers are numbers as counted from tracks adjoining a zone boundary which are ±1 tracks toward a plus side (+ side) on an outer circumferential side of the disk and a minus side (− side) on an inner circumferential side of the disk.

In the Examples shown below, the disks were produced with various mold temperatures, dwell periods and dwell pressures. However, the mold temperature and the resin temperature are conditional factors which serve in the same manner in relation to temperature. Accordingly, they exhibit an identical correlation concerning influences exerted on the variation in magnetooptic information signals. Thus, in the following Examples, the mold temperature will be referred to only, and the resin temperature will be omitted.

Figure 7:
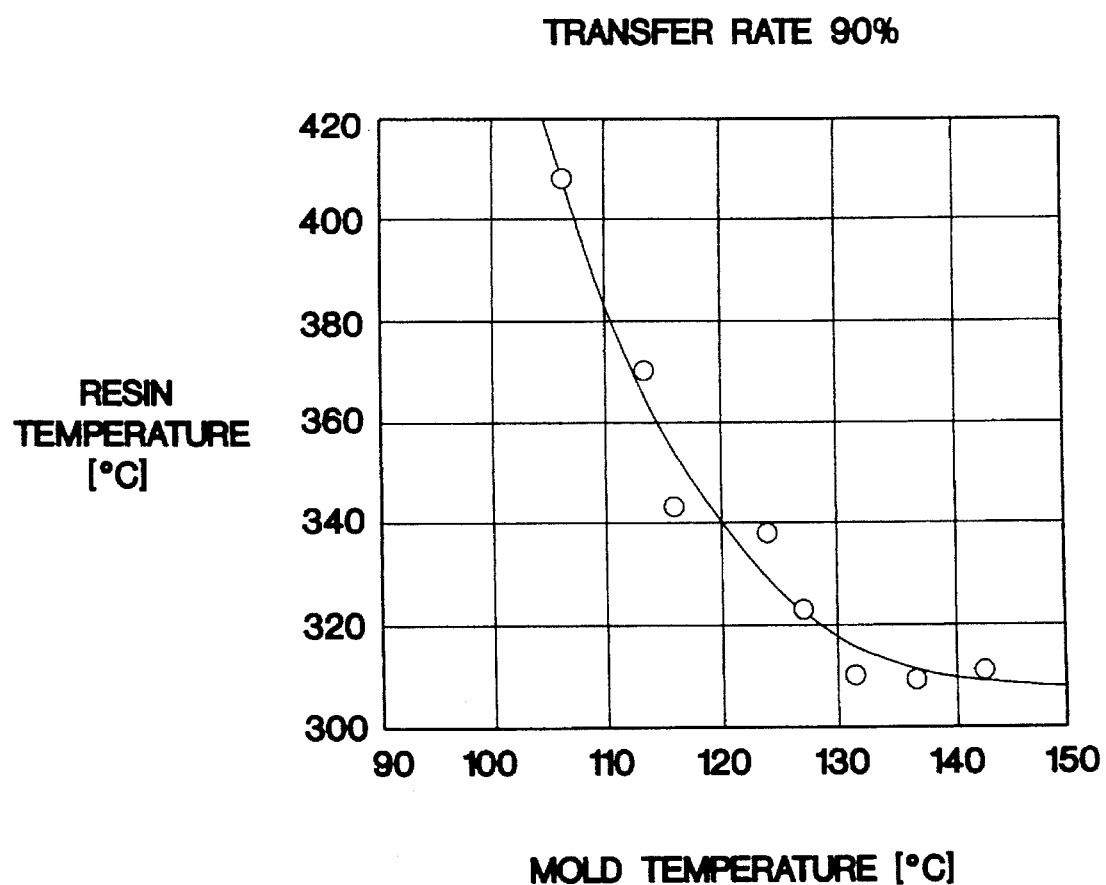
FIG. 7 shows a graph, in which changes in resin temperature versus mold temperature are illustrated.

FIG. 7 shows a graph, in which changes in resin temperature versus mold temperature are illustrated by selecting transfer rate 90%. The transfer rate means the ratio of prepit depth of the substrate to convex height of the stamper.

EXAMPLE 1

Figure 2:
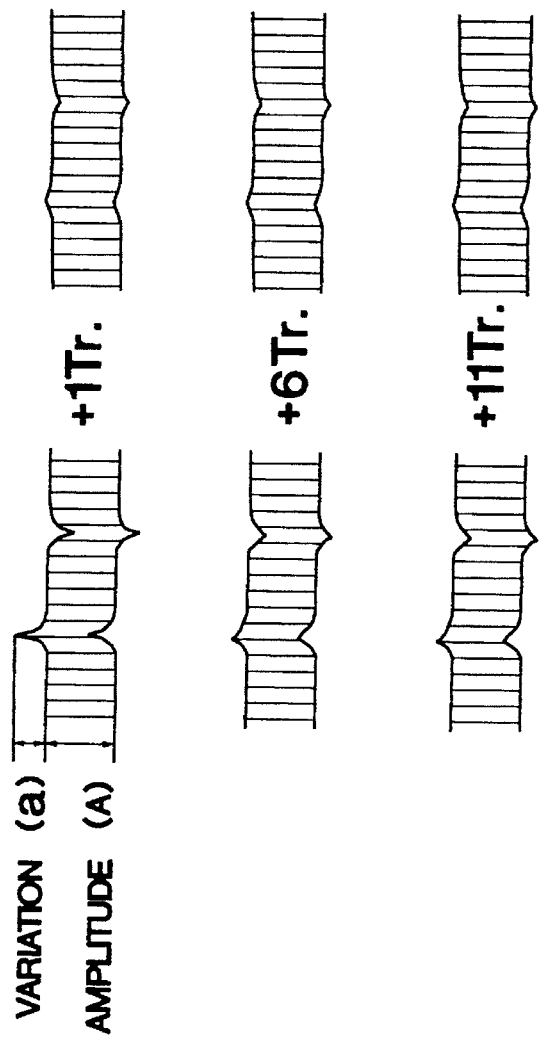
FIG. 2 shows illustrative views of signal shapes in the innermost circumferential zone boundary areas of Example 1 for comparing variations in magnetooptic information signals for a disk manufactured by a conventional method and a disk manufactured under molding conditions according to the present invention.

FIG. 2 shows illustrations for comparing magnetooptic information signals in innermost circumferential zone boundary areas of a disk produced by a conventional method and a disk produced under molding conditions according to the present invention. These illustrations show the shapes of electrically reproduced signals of recorded magnetooptic information signals. Symbols (A), (a) in FIG. 2 indicate a signal in the absence of local birefringence in the vicinity of pre-pits (depicted as an amplitude), and a variation of the signal due to an influence of the birefringence, respectively. The signals from each of the tracks correspond to those of the tracks in FIG. 1, respectively.

In this Example, the molding conditions of the disk according to the present invention are a mold temperature of 126° C., a dwell pressure of 359 kg/cm$^2$, and a dwell period of 0.31 second. On the other hand, the molding conditions of the disk of the conventional method are the same in the mold temperature and the dwell pressure, but different in a dwell period of 0.47 second, wherein the transfer performance for a stamper shape is considerably better than that of the disk according to the present invention.

Figure 3A:
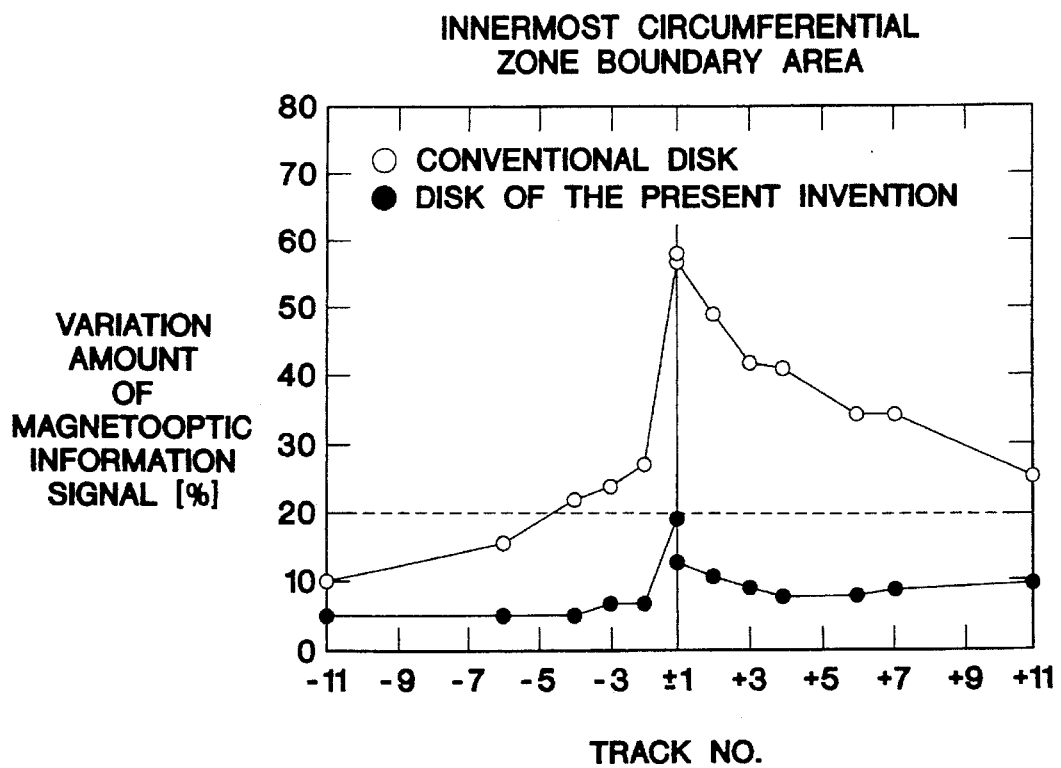
FIG. 3 shows graphs concerning Example 1, in which changes in variation amounts of magnetooptic information signals in accordance with movement over tracks are plotted for innermost and outermost circumferential zone boundary areas in relation to the disks shown in FIG. 2.
Figure 3B:
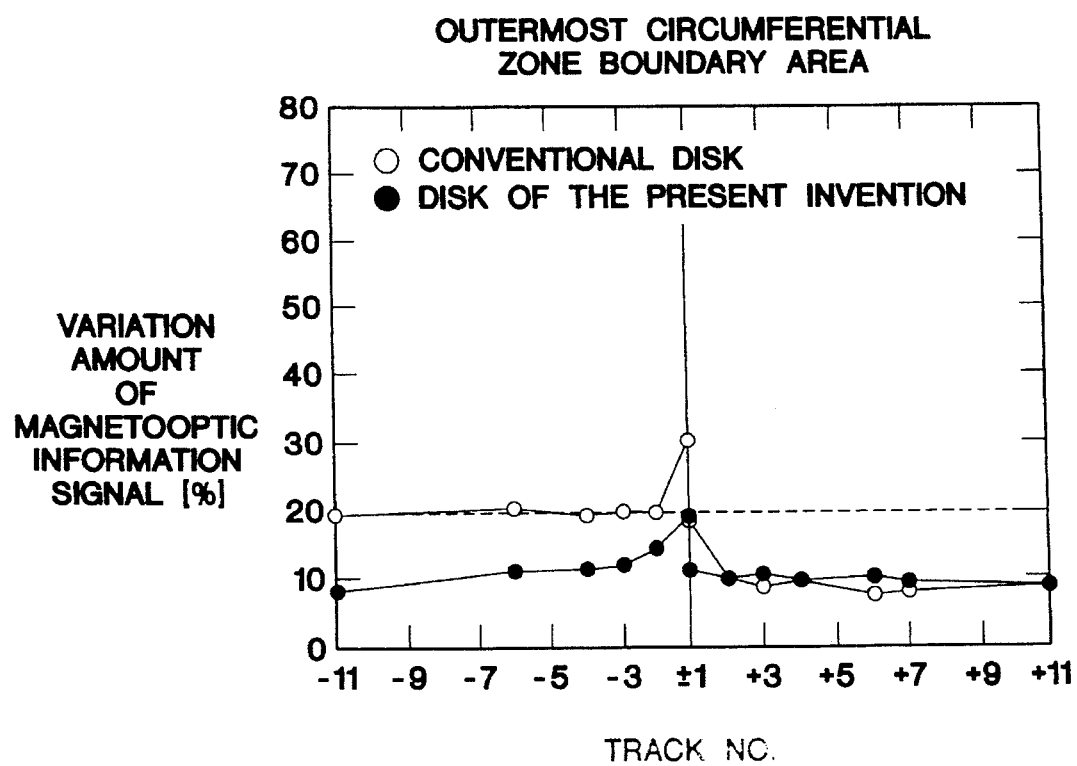

FIG. 3 shows graphs in which variation amounts of magnetooptic information signals of the both disks in FIG. 2 are plotted for each of the tracks by selecting maximum values from innermost and outermost circumferential zone boundary areas. The axis of the ordinate indicates representative values in the percentage of the variation amount (a/A) of a recorded magnetooptic information signal with respect to an amplitude. The axis of the abscissa indicates track numbers in a zone boundary area, as defined in FIG. 1. It is understood from FIGS. 2 and 3 that the signal variation amount in the zone boundary area is decreased in the disk of the present invention produced under the molding conditions according to the present invention as compared with the disk produced by the conventional method. In order to avoid the variation in magnetooptic information signals which may cause a signal error, it is necessary to limit the variation amount to a maximum of 20% or less. The disk produced under the molding conditions according to the present invention satisfies this condition.

Figure 4:
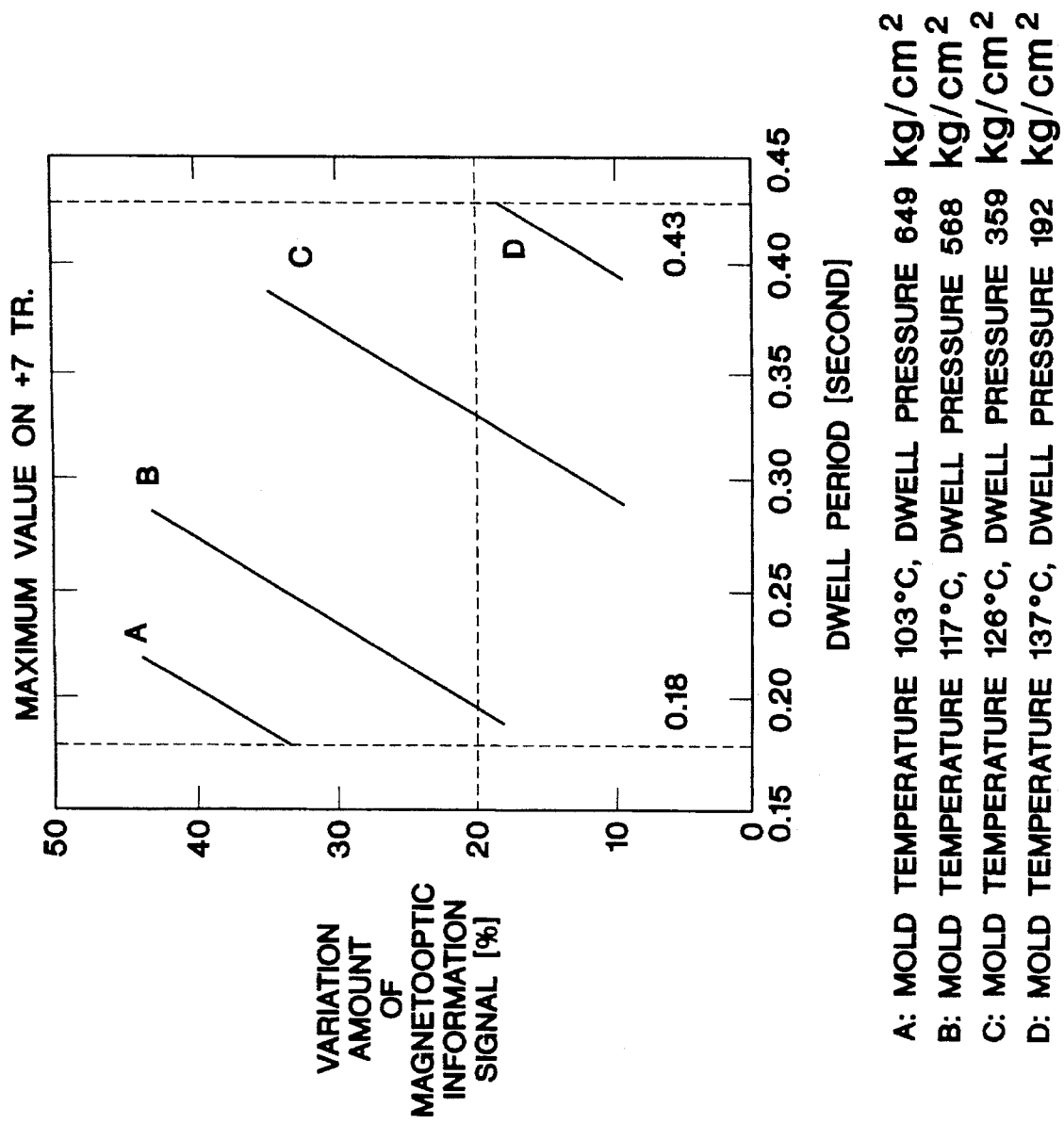
FIG. 4 shows a graph concerning Example 1, in which changes in variation amounts of magnetooptic information signals versus dwell period are illustrated by selecting maximum values from +7 tracks in all zone boundary areas in relation to a disk manufactured by a conventional method and three kinds of disks manufactured under molding conditions according to the present invention.

FIG. 4 shows a graph in which variation amounts (a/A) of magnetooptic information signals in zone boundary areas were plotted for disks produced by changing the dwell period while maintaining a constant mold temperature and a constant dwell pressure. In this figure, maximum variation amounts were selected and plotted from seventh tracks (+7 Tr) on the outer circumferential side in all of the zone boundary areas.

Disk A resides in a mold temperature of 103° C. and a dwell pressure of 649 kg/cm$^2$ which are not included in the ranges of the mold temperature and the dwell pressure defined in the present invention. Disk B was produced with a mold temperature of 117° C. and a dwell pressure of 568 kg/cm$^2$. Disk C was produced with the same mold temperature and dwell pressure as those of the disk of the present invention in FIGS. 2 and 3. Disk D was produced with a mold temperature of 137° C. and a dwell pressure of 192 kg/cm². Accordingly, disks B, C and D have the mold temperature and the dwell pressure within the ranges defined in the present invention.

Common to all of these disks is a tendency for the amount of variation to increase in accordance with an increase in the time of the dwell period. However, in any case, if the dwell period becomes shorter than a certain period of time, the transfer performance of pre-pits is too low, and their modulation degrees become too small, making reproduction impossible. On the contrary, if the dwell period is longer than a certain period of time, the disk becomes difficult to peel off, as it adheres to the mold, causing problems such as pit deviation. Accordingly, in order to manufacture a disk which can reproduce signals effectively, the dwell period must be within a predetermined range. Those generally included in this range, that is a range embracing a dwell period of 0.18–0.43 second as shown by dotted lines in the figure, are only plotted in the graph.

Disk A of the conventional method cannot provide a variation amount of not more than 20% within this range. Disks B, C and D have a region which provides a variation amount of not more than 20% within this range. However, disks B and D have narrow regions which prevent the variation amount from being more than 20%. Accordingly, considering a dispersion in disk formation during molding, disk C is more suitable owing to an extent that a margin of dwell period for supplementing the dispersion is large.

EXAMPLE 2

Figure 5:
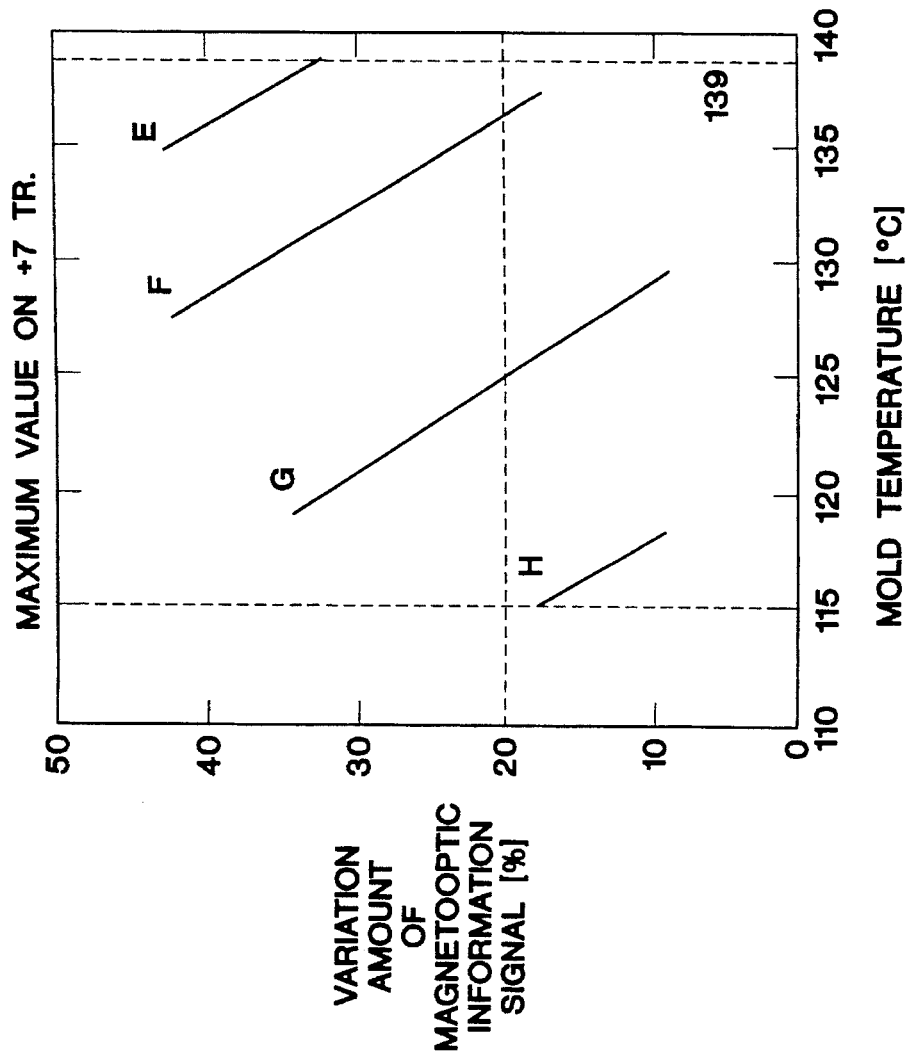
FIG. 5 shows a graph concerning Example 2, in which changes in variation amounts of magnetooptic information signals versus mold temperature are illustrated by selecting maximum values from +7 tracks in all zone boundary areas in relation to a disk manufactured by a conventional method and three kinds of disks manufactured under molding conditions according to the present invention.

FIG. 5 shows a graph in which variation amounts of magnetooptic information signals in zone boundary areas were plotted for disks produced by changing the mold temperature in a molding machine while maintaining a constant dwell period and a constant dwell pressure. In this figure, maximum variation amounts were selected and plotted from seventh tracks (+7 Tr) on the outer circumferential side in all of the zone boundary areas.

Molding conditions for disk E shown herein specify a dwell period of 0.48 second and a dwell pressure of 651 kg/cm² which are not included in the ranges of the dwell period and the dwell pressure according to the present invention. Disk F was produced with a dwell period of 0.42 second and a dwell pressure of 565 kg/cm². Disk G was produced with a dwell period of 0.32 second and a dwell pressure of 368 kg/cm². Disk H was produced with a dwell period of 0.17 second and a dwell pressure of 197 kg/cm². Accordingly, disks F, G and H have the dwell period and a dwell pressure within the ranges defined in the present invention.

All of the disks exhibit a tendency wherein the variation amount decreases as the mold temperature increases. In order to avoid the variation in magnetooptic information signals which may cause a signal error, it is necessary to limit the variation amount no more than a maximum of 20%. However, in any case, if the mold temperature becomes higher than a certain temperature, the transfer performance of pre-pits is too low, and their modulation degrees become too small, a signal error will occur, making reproduction impossible. On the contrary, if the mold temperature is lower than a certain temperature, the retardation of the whole disk becomes unnecessarily large, and the error rate of %he disk increases. Accordingly, in order to manufacture a disk which can reproduce signals effectively, the mold temperature must be within a predetermined range. Those generally included in this range, that is a range embracing a mold temperature of 115°–139° C. as shown by dotted lines in the figure, are only plotted in the graph. The disk E, using the conventional method cannot provide a variation amount of 20% or less within this range. Disks F, G and H have a region which provides a variation amount of 20% or less within this range. However, disks F and H have narrow regions which make the variation amount no more than 20%. Accordingly, considering a dispersion in disk formation during molding, disk D is more suitable primarily because the margin of mold temperature for supplementing the dispersion is large.

EXAMPLE 3

Figure 6:
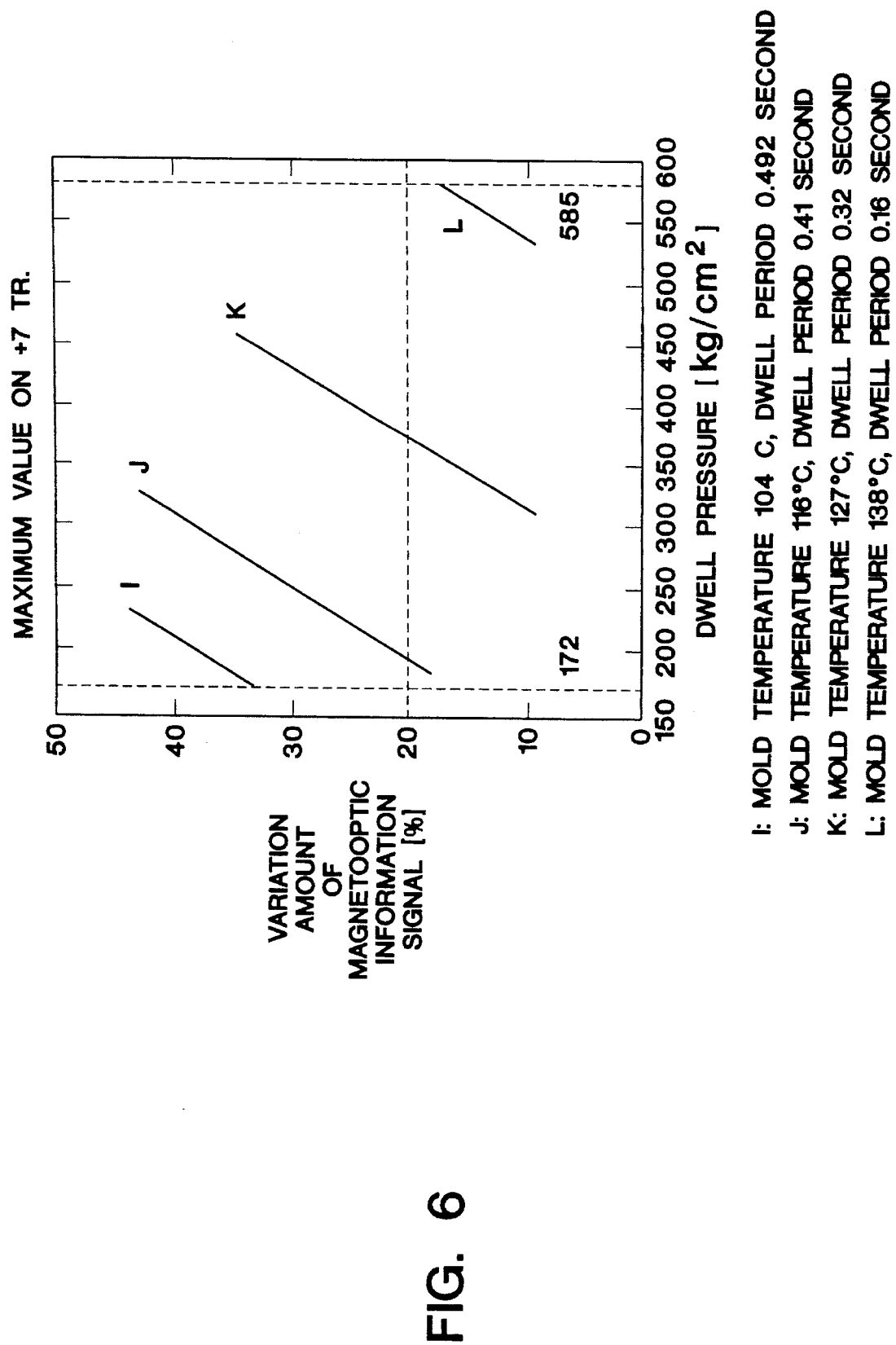
FIG. 6 shows a graph concerning Example 3, in which changes in variation amounts of magnetooptic information signals versus dwell pressure are illustrated by selecting maximum values from +7 tracks in all zone boundary areas in relation to a disk manufactured by a conventional method and three kinds of disks manufactured under molding conditions according to the present invention.

FIG. 6 shows a graph in which variation amounts of magnetooptic information signals in zone boundary areas were plotted for disks produced by changing the dwell pressure during molding while maintaining a constant mold temperature in a molding machine and a constant dwell period during molding. In this figure, maximum variation amounts were selected and plotted from seventh tracks (+7 Tr) on the outer circumferential side in all of the zone boundary areas.

Molding conditions for the disk I shown herein are a mold temperature of 104° C. and a dwell period of 0.492 second which are not included in the ranges of the mold temperature and the dwell period defined in the present invention. Disk J was produced with a mold temperature of 116° C. and a dwell period of 0.41 second. Disk K was produced with a mold temperature of 127° C. and a dwell period of 0.32 second. Disk L was produced with a mold temperature of 138° C. and a dwell period of 0.16 second. Accordingly, disks J, K and L have a mold temperature and a dwell period within the ranges defined in the present invention.

All of the disks exhibit a tendency that the variation amount increases as the dwell pressure increases. In order to avoid the variation in magnetooptic information signals which may cause a signal error, it is necessary to limit the variation amount to a maximum of 20% or less. However, in any case, if the dwell pressure becomes weaker than a certain dwell pressure, the transfer performance of pre-pits is too low, and their modulation degrees become too small, a signal error will result, making reproduction impossible. On the contrary, if the dwell pressure is increased beyond a certain level, the disk becomes difficult to peel from the mold and pit deviation is easily caused. Accordingly, in order to manufacture a disk which can reproduce signals effectively, the dwell pressure must be within a predetermined range. Those generally included in this range, that is a range embracing a dwell pressure of 172–585 kg/cm² as shown by dotted lines in the figure, are only plotted in the graph. Disk I of the conventional method cannot provide a variation amount of 20% or less within this range. Disks J, K and L have a region which provides a variation amount of 20% or less within this range. However, disks J and L have narrow regions creating a variation amount of not more than 20%. Accordingly, considering the dispersion in disk formation during molding, disk K is more suitable primarily because the margin of dwell pressure for supplementing the dispersion is large.

According to the present invention, the variation in magnetooptic information signals due to adjacent pre-pits can be reduced by optimizing the molding conditions during molding of the resin substrate. In particular, the variation can be effectively reduced by changing the molding conditions to lower transfer performance of grooves and pre-pits as compared with the conventional art. A large effect is especially obtained by raising the mold temperature (or the resin temperature) in a molding machine, decreasing the dwell pressure during molding, and/or shortening the dwell period. The mold temperature is 111°–142° C. (corresponding to the resin temperature of 310°–375° C.), the dwell pressure is 150–600 kg/cm$^2$, and the dwell period is 0.15–0.44 second. A considerable effect is obtained by optimizing a combination of each of them within these ranges.

Thus, a format, in which pre-pits are not aligned on adjacent tracks in a radial direction of a disk, but exist at positions deviating in circumferential directions of the tracks as in the ZCAV system, is of course acceptable. Namely, an effect is obtained in that the local variation which appears on a magnetooptic information signal is suppressed to 20% or less with respect to the amplitude of the signal on adjacent or near tracks, or the retardation variation, which is measured with convergent light at such a position, amounts to no more than 10 nm, which significantly reduces the occurrence of an error. This simultaneously provides an effect in that the original waveform slice process is easily used.

The present invention may be practiced or embodied in other specific forms without departing from the spirit or essential characteristics thereof. The preferred embodiments described herein are therefore illustrative and not restrictive, the scope of the present invention being indicated by the appended claims and all changes, variations and modifications which come within the meaning of the claims are intended to be embraced therein.

We claim:

1. A magnetooptic recording medium comprising a substrate and a magnetooptic recording film thereon, said medium having, on said substrate, a plurality of tracks on which magnetooptic recording signals are recorded, a part of said tracks selected from the plurality of tracks including clusters of pre-pits having pre-pit densities of at least $2 \times 10^5$ pre-pits/mm$^2$, wherein (a/A)≦20% is satisfied, provided that (a) is a difference in magnitude between a variation in light amount detected in a track region within 10 tracks from the tracks including the cluster of pre-pits and a variation in light amount (A) detected in a track region other than the track region, when signals from the tracks with recorded magnetooptic recording signals are measured by changes in light amount on the basis of Kerr rotational angles of reflected light from the medium.

2. The magnetooptic recording medium according to claim 1, wherein said substrate is formed by injection-molding a resin with an optical elastic constant of not more than $1 \times 10^{-3}$ mm$^2$/kg in a mold with an attached stamper at a mold temperature of 111°–142° C. at a dwell pressure of 150–600 kg/cm$^2$ for a dwell period selected within a time range of 0.18–0.43 second so that a variation amount of retardation measured by using convergent light is not more than 10 nm.

3. The magnetooptic recording medium according to claim 1, wherein said substrate is formed by injection-molding a resin with an optical elastic constant of not more than $1 \times 10^{-3}$ mm$^2$/kg in a mold with an attached stamper for a dwell period of 0.15–0.44 second at a dwell pressure of 150–600 kg/cm$^2$ at a mold temperature selected within a temperature range of 115°–139° C. so that a variation amount of retardation measured by using convergent light is not more than 10 nm.

4. The magnetooptic recording medium according to claim 1, wherein said substrate is formed by injection-molding a resin with an optical elastic constant of not more than $1 \times 10^{-3}$ mm$^2$/kg in a mold with an attached stamper at a mold temperature of 111°–142° C. for a dwell period of 0.15–0.44 second at a dwell pressure selected within a range of 172–585 kg/cm$^2$ so that a variation amount of retardation measured by using convergent light is not more than 10 nm.

5. The magnetooptic recording medium according to claim 4, wherein said stamper has a pit height of not more than 180 nm, and an angle formed by a pit side surface and a stamper surface is not more than 55°.

6. The magnetooptic recording medium according to claim 1, wherein magnetooptically recorded information signals are reproduced by slice processing original waveforms as they are to convert into a binary system without signal processing by differentiation.

7. The magnetooptic recording medium according to claim 1, wherein magnetooptically recorded information signals are detected by using differentiation of first or second order.

8. The magnetooptic recording medium according to claim 1, having a format wherein the pre-pits are not aligned on adjacent tracks in a radial direction of a disk but exist at positions deviating in circumferential directions of the tracks.

9. The magnetooptic recording medium according to claim 8, wherein said magnetooptic recording medium is such that it is applicable in a ZCAV system.

10. A magnetooptic recording medium comprising a substrate and a magnetooptic recording film thereon, said substrate having a surface comparted into a plurality of tracks on which magnetooptic recording signals are recorded, and a part of said tracks selected from the plurality of tracks including clusters of pre-pits, wherein a variation of a change in light amount due to local birefringence in the vicinity of the pre-pits is not more than 20% with respect to a change in light amount in the absence of the local birefringence, when signals from the tracks with recorded magnetooptic recording signals are measured by changes in light amount on the basis of Kerr rotational angles of reflected light from the medium.

11. The magnetooptic recording medium according to claim 10, wherein said clusters of pre-pits have pre-pit densities of at least $2 \times 10^5$ pre-pits/mm$^2$.

\* \* \* \* \*